United States Patent Office 3,430,258
Patented Feb. 25, 1969

3,430,258
BARBITURIC ACID DERIVATIVES AND A PROCESS FOR PREPARATION THEREOF
Shigeo Senda, Gifu, Hajime Fujimura, Kyoto, and Hiroshi Izumi, Gifu, Japan, assignors to Takeda Chemical Industries Ltd., Osaka, Japan
No Drawing. Filed July 21, 1966, Ser. No. 566,737
U.S. Cl. 260—257  9 Claims
Int. Cl. C07d 51/20; A61k 27/00

ABSTRACT OF THE DISCLOSURE 1-cyclohexyl- or 1-phenyl-5-(4-hydroxy-n-butyl)barbituric acid and 1-cyclohexyl- or 1-phenyl-5-(3-hydroxy-n-butyl)barbituric acid are metabolites of 1-cyclohexyl- or 1-phenyl-5-n-butylbarbituric acid, respectively, and these metabolites and their related compounds such as 1-substituted-5-(3-oxo-n-butyl)barbituric acid and 1-substituted-5-(3-carboxypropyl)barbituric acid show not only uricosuric action but also high anti-inflammatory activity and less toxicity than the corresponding 1-substituted-5-butylbarbituric acids and hitherto-known anti-inflammatory agents.

---

This invention relates to novel compounds useful as anti-inflammatory and uricosuric agents. More concretely stated, the invention is concerned with a series of 1,5-disubstituted barbituric acids and their pharmaceutically acceptable alkaline salts, the series having not only superior anti-inflammatory activity with less toxicity than hitherto-known 1,5-disubstituted barbituric acids but also uricosuric action.

The present invention is based upon the findings that 1-cyclohexyl- or 1-phenyl-5-(4-hydroxy-n-butyl)barbituric acide and 1-cyclohexyl- or 1-phenyl-5-(3-hydroxy-n-butyl)barbituric acid are metabolites of 1-cyclohexyl- or 1-phenyl-5-n-butylbarbituric acid, respectively, and that these metabolites and their related compounds such as 1-substituted-5-(3-oxo-n-butyl)barbituric acid and 1-substituted-5-(3-carboxypropyl)barbituric acid show not only uricosuric action but also high anti-inflammatory activity and less toxicity than the corresponding 1-substituted-5-butylbarbituric acids and hitherto-known anti-inflammatory agents.

The objective compounds of the present invention are those represented by the general formula

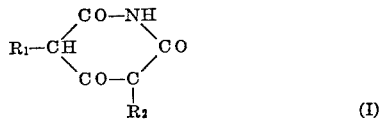

(I)

and the pharmaceutically acceptable alkaline salts thereof, wherein $R_1$ stands for 4-hydroxy-n-butyl, 3-hydoxy-n-butyl, 3-carboxypropyl or 3-oxo-n-butyl and $R_2$ stands for cyclohexyl or phenyl.

These new compounds are not only as effective as 5-n-butyl-1-cyclohexyl-barbituric acid or 5-n-butyl-1-phenyl-barbituric acid in anti-inflammatory activity but are essentially free from undesirable side effects and have lower toxicity than the said compounds; moreover, the new compounds are useful as antarthritics due to their superior uricosuric action ascribable to the long-lasting character of such action in comparison with prior compounds.

Otherwise stated, the present invention embodies a group of novel and useful barbituric acid derivatives as antarthritics and a new type of nonsteroidal and low toxic anti-inflammatory agents. Pharmaceutical compositions which comprise at least one of the aforesaid novel barbituric acid derivatives, are used for the therapy of gout and of various kinds of inflammations, and have high anti-inflammatory activity and substantially no side effect.

(A) The new compounds (I) can be prepared as follows:

(a) Among the compounds of the Formula I, those wherein $R_1$ is 3-carboxypropyl radical may be prepared by reacting malonic acid derivatives represented by the Formula II with corresponding urea derivatives represented by the Formula III and then hydrolyzing the resultant product:

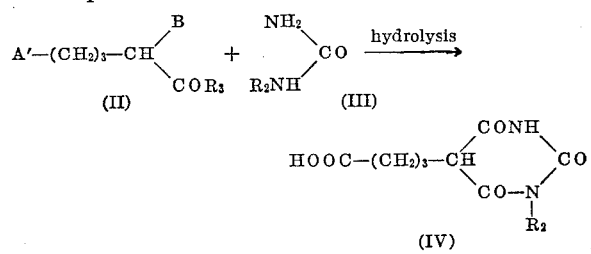

wherein A' stands for lower alkoxycarbonyl (e.g. methoxycarbonyl, ethoxycarbonyl, propoxycarbonyl, isopropoxycarbonyl, butoxycarbonyl, isobutoxycarbonyl, etc.), aryloxycarbonyl (e.g. phenyloxycarbonyl, naphthyloxycarbonyl, etc.), or aralkyloxycarbonyl (e.g. benzyloxycarbonyl, etc.), groups, B stands for cyano or —$COR_3$ and $R_3$ stands for lower alkoxy (e.g. methoxy, ethoxy, propoxy, isopropoxy, butoxy, isobutoxy, etc.), aryloxy (e.g. phenyloxy, etc.), or aralkyloxy (e.g. benzyloxy, etc.), groups and $R_2$ has the same meaning as in Formula I.

(b) The compounds of the Formula I wherein $R_1$ is 4-hydroxy-n-butyl group may be prepared by reacting malonic acid derivative of Formula V and the corresponding urea derivative of Formula III, and then hydrolyzing the resultant product:

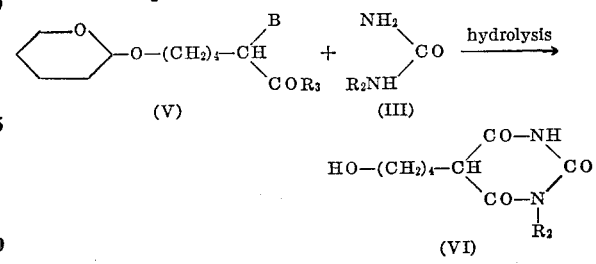

wherein B, $R_2$ and $R_3$ have the same meaning as above.

In the courses (A)–(a) and (A)–(b), as the compounds of Formulae II and V there are preferably employed those in which both B and —$COR_3$ stand for lower alkoxycarbonyl groups such as methoxycarbonyl, ethoxycarbonyl, propoxycarbonyl and butoxycarbonyl.

The reaction in the courses (A)–(a) and (A)–(b) may be carried out at room temperature (about 15° to 30° C.) but is usually accelerated by heating. As the solvent for the reaction, there is usually employed lower aliphatic alcohol such as methanol, ethanol, propanol or t-butanol, but there can be employed any solvent other than the lower aliphatic alcohols so long as it does not disturb the proceeding of the reaction. The reaction is desirably brought about in the presence of a condensation catalyst such as alkali metal alkoxide (e.g. sodium methoxide, potassium methoxide, sodium ethoxide, potassium ethoxide, and the like), alkali metal (e.g. sodium and potassium), magnesium, magnesium alkoxide (e.g. magnesium methoxide, magnesium ethoxide, and the like), etc.

Thus, the intermediate is produced.

In the course of (A)–(a) the above reaction produces the intermediate having the general formula

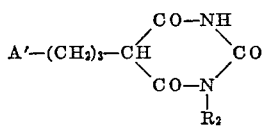

wherein A' and R₂ have the same meanings as in Formula I, while in the course of (A)–(b) the intermediate produced by the above reaction has the general formula

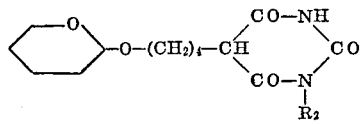

wherein R₂ has the same meaning as in Formula I.

The hydrolysis of this intermediate may be carried out after per se known manner such as treatment with acidic materials which may be exemplified by mineral acid (e.g. hydrochloric acid, sulfuric acid, phosphoric acid, etc.) and cation ion exchange resin.

The starting material II in (A)–(a) procedure can be prepared, for example, by reacting under heating a malonic acid derivative of the formula

and a γ-halo compound of the formula

X—CH₂—CH₂—CH₂—A' wherein B, R₃ and A' have the same meanings as in Formula II, X stands for a halogen atom such as chlorine, bromine, iodine, in a solvent such as a lower aliphatic alcohol (e.g. methanol, ethanol, etc.), desirably with the use of a condensation catalyst such as alkali metal alkoxide (e.g. sodium methoxide, sodium ethoxide, potassium methoxide, potassium ethoxide).

And the starting material (V) in (A)–(b) course may be prepared, for example, through the following reactions:

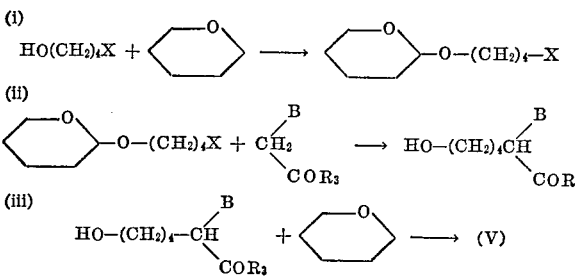

wherein B and R₃ have the same meanings as in Formula V, X stands for a halogen atom such as chlorine, bromine, iodine. The reactions (i) and (iii) may be carried out, desirably in the presence of a mineral acid such as hydrochloric acid, sulfuric acid, etc., at room temperature or under heating. The reaction (ii) may be carried out at room temperature or under heating, desirably in the presence of sodium iodide. In carrying out these reactions, a suitable solvent such as ether, dioxane, toluene, xylene, etc. may be employed.

(B) Compounds of the Formula I wherein R₁ is 3-oxo-n-butyl may be prepared by either of the following two courses:

(a) Reaction between methyl vinyl ketone and a barbituric acid derivative of the Formula VII

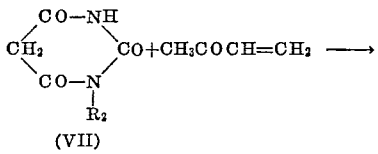

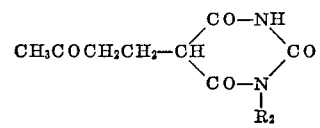

wherein R₂ has the same meaning as in the Formula I:

The reaction may be carried out at room temperature, but more preferably under heating, the heating temperature being about the boiling point of solvent used or a little lower. As the solvent for the reaction, there is employed a lower aliphatic alcohol such as methanol, ethanol and t-butanol, ether, benzene, dioxane or ethyl acetate, but there can be employed any other solvents so long as they do not disturb the proceeding of the reaction. And, if desired, the reaction may be carried out in the absence of solvent. In such a case, the reaction is also accelerated by heating to about 100° C.

The reaction is desirably carried out in the presence of a condensation catalyst such as alkali metal hydroxide (e.g. sodium hydroxide, potassium hydroxide, etc.), alkali metal carbonate (e.g. sodium carbonate, potassium carbonate, etc.), organic base (e.g. triethylamine, diethylamine, pyridine, piperazine, etc.), alkali metal (e.g. sodium, potassium, etc.), alkali metal alkoxide (e.g. sodium methoxide, potassium methoxide, sodium ethoxide, potassium ethoxide, etc.), and the like.

(b) Reaction between a compound represented by the Formula IX and corresponding urea derivative:

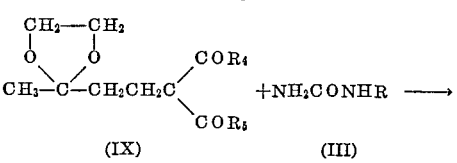

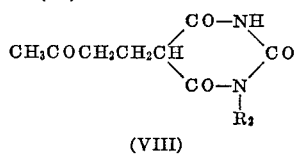

wherein R₂ has the same meaning as in Formula I, and R₄ and R₅ stand for lower alkoxy (e.g. methoxy, ethoxy, propoxy, isopropoxy, butoxy, isobutoxy), aryloxy (e.g. phenoxy) or aralkyloxy (e.g. benzyloxy), respectively.

The starting material (IX) may be prepared, for example, by reacting malonic acid or any of its derivatives and methyl vinyl ketone, and subsequently reacting the resultant product with ethylene glycol.

In the reaction of this procedure (B)–(b), the reaction preferably is carried out in the presence of a condensation catalyst such as alkali metal alkoxide (e.g. sodium methoxide, potassium methoxide, sodium oxide, potassium ethoxide, etc.), magnesium alkoxide (e.g. magnesium methoxide, magnesium ethoxide, etc.), alkali metal (e.g. sodium, potassium, etc.), magnesium, sodium amide, and the like. The reaction is usually accelerated by heating. The reaction is usually carried out in a lower aliphatic alcohol such as methanol, ethanol, propanol and butanol although any other solvent can be used so long as it does not disturb the course of the reaction. The solvent desirably should be as dry (dehydrated) as possible. The malonic acid ester derivative preferably is a lower alkyl ester such as a methyl ester, an ethyl ester or a propyl ester for the reaction to proceed smoothly, but other esters such as a phenyl ester, benzyl ester or a higher alkyl ester may be employed, if desired.

(c) Compounds of the Formula I wherein $R_1$ is 3-hydroxy-n-butyl group can be prepared by reducing a compound represented by the following Formula VII, which is produced by the course (B)–(a) or (B)–(b):

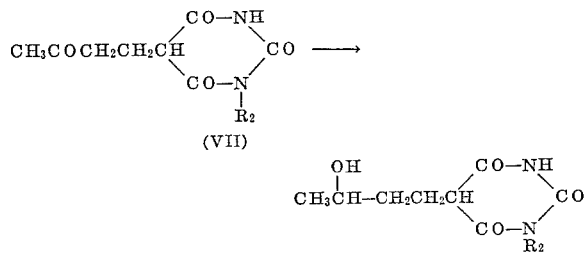

(VII)

wherein $R_2$ has the same meaning as in Formula I.

The reaction can be carried out in the presence or absence of a solvent by adding a reducing agent to the reaction system or by introducing hydrogen gas into the reaction medium in the presence of a suitable catalyst.

Any suitable reducing agent can be used, for example, a metal and an alcohol (e.g. the metal being sodium, calcium, potassium, lithium, magnesium, zinc, sodium-amalgam, magnesium-amalgam, or aluminum-amalgam and the alcohol being methanol or ethanol), a metal such as sodium, sodium-amalgam, magnesium, magnesium-amalgam, aluminum-amalgam, zinc or iron, or a metal and an alkali (e.g. the metal being aluminum, zinc or aluminum-amalgam and the alkali being sodium hydroxide or potassium hydroxide) as well as aluminum isoproproxide and isopropyl alcohol, stannous chloride, ferrous chloride, complex metal hydride (e.g. lithium aluminum hydride, sodium borohydride or potassium borohydride), and any chemical equivalent thereof.

Examples of catalysts for the catalytic reduction are platinum catalysts (e.g. platinum sponge, platinum black, platinum plate, platinum oxide or colloidal platinum), palladium catalysts (e.g. colloidal palladium, palladium sponge or palladium black), nickel catalysts (e.g. reduced nickel, nickel oxide, Raney nickel or Urushibara nickel) or other metals or metal compounds belonging to the cobalt series, copper series, iron series, molybdenum series, tungsten series, zinc series, catalysts consisting of two or more of the above-mentioned metals and/or metal compounds (i.e. binary catalysts, multiple catalysts or alloy catalysts) and any of the above-mentioned catalysts supported on a carrier such as diatomaceous earth, clay, activated carbon, silica, alumina or asbestos. Although, theoretically, one mole of hydrogen per mole of the starting barbituric acid derivative is absorbed during the reaction, an excess of hydrogen may be passed into the reaction system.

A solvent for the reaction preferably is an alcohol such as methanol or ethanol, an ether such as ether, dioxane or tetrahydrofuran, but any other solvent may be employed so long as it does not disturb the reaction. The reaction may be carried out at room temperature or by heating. The reaction can be carried out at atmospheric pressure, if desired.

The reaction desirably is carried out under neutral or alkaline conditions. When the reaction is carried out under alkaline conditions, the other reaction conditions are preferably moderate.

The desired barbituric acid derivatives of general Formula I may be isolated in the free acid form or in the form of alkaline salt such as sodium salt, potassium salt, ammonium salt, calcium salt or magnesium salt. Either form is easily convertible to the other form. For example, the free acid is changed into a desired salt thereof by adding the former to an alcoholic or aqueous medium containing approximately the equivalent amount of the base desired to form the salt, and by concentrating the mixture and/or allowing the same to cool on standing. On the other hand, a salt can be changed into the free acid in manner well known per se, that is by neutralizing the former with an acid such as hydrochloric acid, hydrobromic acid or sulfuric acid or cation-exchange resin. Commercially available cation-exchange resins for the process of the present invention include, for example, Amberlite IR–120, Dowex 50, Permutit Q, and Daiaion SK No. 1.

The novel barbituric acid derivatives I are characterized by their valuable physiological activities and physiochemical properties:

(1) One of the characteristics of the present compounds I is their low toxicity as shown by the following tests.

A tragacanth emulsion of each test compound was administered intraperitoneally or orally to mice (dd-strain) weight 14 to 15 grams, and $LD_{50}$ and 95%-confidence limits were calculated by Litchfield-Wilcoxon method on the basis of the number of mice that died during 24 hours after the administration. The result is shown in Table 1, which demonstrates that the compounds of this invention are significantly less toxic than not only phenylbutazone or aminopyrine, but also corresponding 1-cyclohexyl-5-substituted barbituric acid derivatives.

TABLE 1

| Test compound | $LD_{50}$ (95% C.L.) mg./10 g. in mice | |
|---|---|---|
| | Intraperitoneally | Orally |
| 1-cyclohexyl-5-(4-hydroxy-n-butyl)barbituric acid | 8.10 (7.94–8.27) | 32.3 (25.8–40.4) |
| 1-cyclohexyl-5-(3-oxo-n-butyl)-barbituric acid | 9.6 (8.60–10.70) | |
| 1-cyclohexyl-5-(3-hydroxy-n-butyl)barbituric acid | 9.1 (7.90–10.40) | |
| 1-cyclohexyl-5-(n-butyl)-barbituric acid | 3.31 (2.88–3.81) | 6.45 (5.56–7.49) |
| Phenylbutazone | 2.20 (1.94–2.49) | 3.90 (3.34–4.57) |
| Aminopyrine | 2.69 (2.50–2.82) | 4.38 (4.14–4.64) |

(2) The present compounds I also have an outstanding anti-inflammatory effect.

50 milligrams or 100 milligrams per kilogram of test compounds was injected intraperitoneally to male rats (Wister-strain) weighing 130 to 180 grams. After 30 minutes from the injection, these rats as well as those used for control were injected subcutaneously through hind paw with 0.05 cc. of 1% aqueous carrageenin solution, as substance to provoke inflammatory edema, and the percentages of the maximum inhibition of the edema relative to the control were measured with regard to each test compound. The result is shown in Table 2, which shows that the compounds of the present invention as well as the corresponding 1-cyclohexyl-5-substituted barbituric acids show an anti-inflammatory action superior to phenylbutazone.

TABLE 2

| Test compound | Inhibition to swelling | |
|---|---|---|
| 1-cyclohexyl-5-(4-hydroxy-n-butyl)-barbituric acid | *+3 | +3 |
| 1-cyclohexyl-5-(3-oxo-n-butyl)-barbituric acid | *+4 | +4, +3 |
| 1-cyclohexyl-5-(3-hydroxy-n-butyl)-barbituric acid | *+4 | +4, +3 |
| 1-cyclohexyl-5-(n-butyl)-barbituric acid | *+3, *+3 | +3, +4 |
| Phenylbutazone | *+2 | +3 |
| Aminopyrine | *+1 | +2 |

*50 mg. injected, others 100 mg. injected.
Remarks: +1, 15–25% inhibition; +2, 26–50% inhibition; +3, 51–65% inhibition; +4, inhibition higher than 65%.

(3) The present compounds I also have an outstanding uricosuric action.

As described in Brodie's report (Soc. Exp. Biol. & Medi., vol. 86, p. 884 (1954)), uricosuric action is comparatively parallel to an action of retaining phenolsulfophthalein in the circulation. Thus, the uricosuric action of the present compounds was tested by measuring the action of retaining phenolsulfophthalein in rabbits' circulation after a method of Kreppel which is described in Med. Exp., vol. 1, p. 285 (1958).

That is to say, groups of adult rabbits (1.9–2.4 kg. male, 3 heads in 1 group) received the test compound, 100 mg./kg., intraperitoneally. Fifteen minutes after injection of the test compound, each rabbit received phenolsulfophthalein via vein (75 mg./kg., as a 1.5% solution in 0.9% NaCl). Blood samples were taken by a cardicentesis at 30 minutes, 1 hour, 2 hours and 3 hours after injection of the phenolsulfophthalein. The concentration of phenolsulfophthalein in blood was read at 560 m$\mu$ in a Hitachi spectrophotometer and was calculated as $\gamma$/ml. of blood. The results are shown in Table 3, which shows that the compounds of the present invention have outstanding uricosuric action.

TABLE 3

| Test compound | Retention of phenolsulfophthalein ($\gamma$/blood 1 ml.) | | | |
|---|---|---|---|---|
| | 30 min. | 1 hr. | 2 hr. | 3 hr. |
| 1-cyclohexyl-5-(4-hydroxy-n-butyl)barbituric acid | 97.5±21.5 | 37.7±13.8 | 30.0±15.5 | 12.5±7.5 |
| 1-cyclohexyl-5-(3-hydroxy-n-butyl)barbituric acid | 116.0±12.3 | 46.0±7.8 | 25.5±16.5 | 14.0±5.8 |
| 1-cyclohexyl-5-(3-oxo-n-butyl)-barbituric acid | 136.5±30.0 | 58.0±8.5 | 24.5±8.5 | 13.0±8.0 |
| Control | 67.5±6.3 | 27.0±5.4 | 7.0±2.7 | 1.5±1.0 |

The compounds of the present invention may be administered alone or in combination with pharmaceutically acceptable carriers. On application as anti-inflammatory agent, they may be administered together with aminopyrine or a steroidal anti-inflammatory agent with or without any other pharmaceutically acceptable carriers. The compounds are administrable as powders, tablets, solutions or emulsions for oral administration, or as injections, suppositories for nonoral administration. The choice of the carrier is determined by the preferred route of administration, the solubility of the compound and standard pharmaceutical practice. In general, the dosage of these compounds of the invention is, as an anti-inflammatory agent, about 4 to 40 milligrams per kilogram of body weight per day, and, as antarthritics, about 4 to 20 milligrams per kilogram of body weight per day. Because of their great anti-inflammatory activity, high uricosuric action and low toxicity, it is possible to use dosages of these compounds of greater or less magnitude than that indicated. Especially when these compounds are used together with other anti-inflammatory agents as mentioned above, the dosage may be lessened in accordance with the magnitude of the synergic effect between them.

The following examples are solely for the purpose of illustration and are not to be construed as limitations of this invention. Parts by volume in these examples bear the same relation to parts by weight as do milliliters to grams.

EXAMPLE 1

1.2 parts by weight of metallic sodium is dissolved in 50 parts by volume of absolute methanol and then the methanol is removed by distillation. 15.8 parts by weight of $\delta$-(2-tetrahydropyranyloxy)butyl malonic acid diethyl ester

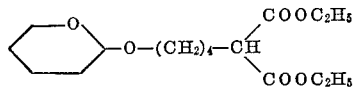

also designable as diethyl $\alpha$-[4-(tetrahydropyran-2-yloxy)butyl]malonate (B.P. 121–123° C./0.03 mm. Hg), 71 parts by weight of cyclohexylurea and 10 parts by volume of benzene are added to the thus-prepared residue, and refluxed under heating for 13 hours to allow a reaction to take place. After cooling, the reaction mixture is extracted with a small amount of water, and the aqueous layer is treated with activated carbon followed by filtration. The filtrate is acidified with hydrochloric acid, the resultant precipitates separated and dissolved in a mixture of 20 parts by volume of ethanol and 20 parts by volume of 2-normal sulfuric acid. On standing for 7 hours, hydrolysis takes place. The ethanol is distilled off under reduced pressure and the residue is dissolved in 50 parts by volume of water to give crystals, which are recrystallized from a mixture of methanol and water to give 72 parts by weight of 1-cyclohexyl-5-(4-hydroxy-n-butyl) barbituric acid as colorless needles melting at 121° C.

Elementary analysis.—Calculated for $C_{14}H_{22}O_4N_2$: C, 59.55%; H, 7.85%; N, 9.92%. Found: C, 59.63%; H, 7.78%; N, 10.12%.

The corresponding 1-phenyl-5-(4-hydroxy-n-butyl) barbituric acid is prepared mutatis mutandis in like manner, the cyclohexylurea being replaced by a corresponding amount of phenylurea.

EXAMPLE 2

2.3 parts by weight of metallic sodium is dissolved in 120 parts by volume of absolute ethanol. To the solution are added 24.2 parts by weight of 3-ethoxycarbonyl propyl malonic acid diethyl ester

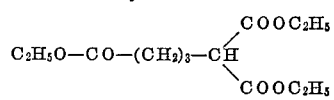

also designable as diethyl $\alpha$-(3-ethoxycarbonylpropyl) malonate, (B.P. 150–160° C./8 mm. Hg) and 14.2 parts by weight of cyclohexylurea, and the resulting mixture is refluxed for 8 hours. On completion of the ensuing reaction, ethanol is removed from the reaction mixture by distillation, and the residue is dissolved in a small amount of water. The aqueous solution is treated with activated carbon under cooling, followed by filtration. The filtrate is acidified with hydrochloric acid, and the resultant precipitates are hydrolyzed with 20% hydrochloric acid. To the hydrolyzate is added water and the mixture is allowed to stand to give solid matter, which is then recrystallized from a mixture of ethanol and petroleum ether to give 18.1 parts by weight of 1-cyclohexyl-5-(3-carboxypropyl)barbituric acid as colorless needle-like crystals melting at 148° C.

Elementary analysis.—Calculated for $C_{14}H_{20}O_5N_2 \cdot H_2O$: C, 53.49%; H, 7.05%; N, 8.91%. Found: C, 54.00%; H, 6.96%; N, 8.82%.

The corresponding 1-phenyl-5-(3-carboxypropyl)barbituric acid is prepared mutatis mutandis in like manner, the cyclohexylurea being replaced by a corresponding amount of phenylurea.

EXAMPLE 3

A mixture of 27.2 parts by weight of $\gamma$-ethylenedioxy butyl malonic acid diethyl ester,

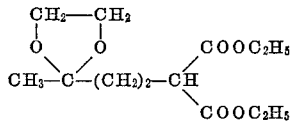

also designable as diethyl $\alpha$-(3,3-ethylenedioxy-n-butyl) malonate, 14.2 parts by weight of cyclohexylurea, 5.4 parts by weight of sodium methoxide and 10 parts by volume of absolute benzene is refluxed under heating for 15 hours to allow the ensuing reaction to go to completion. The reaction mixture is then diluted with 30 parts by volume of benzene and extracted with 200 parts by volume of water. The aqueous layer is treated with activated carbon under cooling, followed by filtration. The filtrate is acidified with hydrochloric acid; to the resultant precipitates is added 100 parts by volume of 15% hydrochloric acid, and the mixture is then heated for 4 hours on a water bath. After cooling, solid matter is collected by filtration and recrystallized from a mixture of ether and petroleum ether to give 4.5 parts by weight of 1-cyclohexyl-5-(3-oxo-n-butyl)barbituric acid as colorless prisms melting at 103°.

*Elementary analysis.*—Calculated for $C_{14}H_{20}O_4N_2$: C, 59.98%; H, 7.19%; N, 9.99%. Found: C, 59.87%; H, 7.19%; N, 9.80%.

The corresponding 1-phenyl-5-(3-oxo-n-butyl)barbituric acid is prepared matatis mutandis in like manner, the cyclohexylurea being replaced by a corresponding amount of phenylurea.

EXAMPLE 4

To 1 part by weight of powdered lithium aluminum hydride suspended in 10 parts by volume of diethyl ether is gradually added 1.3 parts by weight of 1-cyclohexyl-5-(3-oxo-n-butyl)barbituric acid, prepared according to Example 3, dissolved in 100 parts by volume of diethyl ether. The mixture is stirred for 6 hours and then left standing overnight, whereupon reduction takes place. To the resulting mixture is added 5 parts by volume of ethyl acetate, and after 1 hour there is further added 10 parts by volume of a saturated aqueous solution of sodium sulfate, followed by filtration. Thus obtained solid material is gradually dissolved under cooling in diluted hydrochloric acid and is then extracted with chloroform. The chloroform is removed by distillation to yield a residue, which, after being chromatographed with silica gel using chloroform as a solvent, is recrystallized from a mixture of ether and petroleum ether to yield 0.7 part by weight of crystals of 1-cyclohexyl-5-(4-hydroxy-n-butyl)barbituric acid melting at 131°.

*Elementary analysis.*—Calculated for $C_{14}H_{22}O_4N_2$: C, 59.55%; H, 7.85%; N, 9.92%. Found: C, 59.30%; H, 7.73%; N, 9.79%.

EXAMPLE 5

A mixture of 48.2 parts by weight of 1-cyclohexylbarbituric acid, 64 parts by weight of potassium carbonate, 350 parts by volume of ethyl acetate and 17.5 parts by volume of methyl vinyl ketone is refluxed under heating for 6 hours and the resulting precipitates are collected by filtration and dissolved in 300 parts by volume of water. The aqueous solution is treated with activated charcoal under cooling, followed by filtration. The filtrate is weakly acidified with hydrochloric acid and the obtained precipitates are collected by filtration and recrystallized from a mixture of ether and petroleum ether to give 35 parts by weight of 1-cyclohexyl-5-(3-oxo-n-butyl)barbituric acid as colorless prisms melting at 103° C.

*Elementary analysis.*—Calculated for $C_{14}H_{20}O_4N_2$: C, 59.98%; H, 7.19%; N, 9.99%. Found: C, 59.87%; H, 7.19%; N, 9.80%.

The same procedure as in Example 4 but using 1-cyclohexyl-5-(3-oxo-n-butyl)barbituric acid gives 1-cyclohexyl-5-(3-hydroxy-n-butyl)barbituric acid.

EXAMPLE 6

1-phenyl-5-(3-oxo-n-butyl)barbituric acid melting at 158° is prepared from diethyl α-(3,3-ethylenedioxy-n-butyl)malonate and phenylurea after the manner set forth in Example 3. To 7 parts by weight of the 1-phenyl-5-(3-oxo-n-butyl)barbituric acid, dissolved in 100 parts by volume of methanol, is slowly added 5 parts by weight of sodium borohydride under stirring at room temperature (occasional cooling). The mixture is maintained at 60° C. for 1 hour and then the methanol was removed by filtration. To the residue is added about 70 parts by volume of water and then dilute hydrochloric acid slowly added under strong cooling, followed by allowing the mixture to stand overnight under cooling to yield precipitates. After being separated, the precipitates are dissolved in acetone under heating, and to the solution is added water to give 4.1 parts by weight of 1-phenyl-5-(3-hydroxy-n-butyl)barbituric acid as colorless flakes melting at 123°.

*Elementary analysis.*—Calculated for $C_{14}H_{16}O_4N_2$: C, 60.86%; H, 5.84%; N, 10.14%. Found: C, 61.17%; H, 5.73%; N, 10.18%.

What is claimed is:

1. A member selected from the group consisting of compounds of the formula

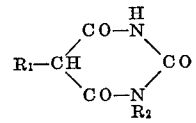

and pharmaceutically acceptable alkaline salts thereof, wherein $R_1$ stands for a member selected from the group consisting of 4-hydroxy-n-butyl, 3-hydroxy-n-butyl, 3-carboxypropyl and 3-oxo-n-butyl, and $R_2$ stands for a member selected from the group consisting of cyclohexyl and phenyl.

2. 1-cyclohexyl-5-(4-hydroxy-n-butyl)barbituric acid.
3. 1-cyclohexyl-5-(3-hydroxy-n-butyl)barbituric acid.
4. 1-cyclohexyl-5-(3-oxo-n-butyl)barbituric acid.
5. 1-cyclohexyl-5-(3-carboxypropyl)barbituric acid.
6. 1-phenyl-5-(3-hydroxy-n-butyl)barbituric acid.
7. 1-phenyl-5-(4-hydroxy-n-butyl)barbituric acid.
8. 1-phenyl-5-(3-oxo-n-butyl)barbituric acid.
9. 1-phenyl-5-(3-carboxypropyl)barbituric acid.

References Cited

UNITED STATES PATENTS 3,274,195  10/1966  Senda et al. _____ 260—257

ALEX MAZEL, *Primary Examiner.*

ANNE MARIE T. TIGHE, *Assistant Examiner.*

U.S. Cl. X.R.

167—65